United States Patent [19]  
Mitchell et al.

[11] 3,931,423  
[45] Jan. 6, 1976

[54] NON-AERATED PUDDING COMPOSITIONS

[75] Inventors: William Alexander Mitchell, Lincoln Park, N.J.; George Emil Orozovich, Flushing; William Charles Seidel, Monsey, both of N.Y.

[73] Assignee: General Foods Corporation, White Plains, N.Y.

[22] Filed: May 16, 1974

[21] Appl. No.: 470,477

[52] U.S. Cl. ................................. 426/579; 426/167
[51] Int. Cl.² .......................................... A23L 1/187
[58] Field of Search ............. 426/167, 96, 329, 350, 426/579

[56] References Cited  
UNITED STATES PATENTS

| | | | |
|---|---|---|---|
| 3,231,391 | 1/1966 | Breivik et al. | 426/167 |
| 3,364,036 | 1/1968 | Tesko | 426/96 |

Primary Examiner—Jeanette M. Hunter  
Attorney, Agent, or Firm—Bruno P. Struzzi; Daniel J. Donovan; Doris M. Bennett

[57] ABSTRACT

Low molecular weight, aliphatic acid esters of polyhydric alcohols when incorporated into instant pudding formulations containing modified starches results in the formation of smooth creamy non-aerated pudding dessert compositions.

6 Claims, No Drawings

NON-AERATED PUDDING COMPOSITIONS

BACKGROUND OF THE INVENTION

The present invention relates to improved creamy pudding compositions and foodstuffs desirably having a similar consistency. More particularly, it concerns the ability of certain low molecular weight, aliphatic acid esters of polyhydric alcohols such as triacetin, to impart to said pudding compositions a creamy texture when the latter contains certain modified starches.

In the preparation of the pudding the housewife is likely to employ rapid mechanical agitation in hydrating the dry mix ingredients with the milk. She usually chooses to employ cold milk in preparing the instant pudding and it is quite often the case that the mix solution foams during mixing. As a result of the rapid onset of gelation this foaming produces an unattractive pebbly surface on the dessert; in addition the internal texture assumes a somewhat aerated condition. For many dessert users the above aerated dessert texture is not appealing to the pallet.

Numerous attempts have been made to solve the foaming problem for standard instant puddings. One example is U.S. Pat. No. 2,801,924, issued to Clausi et al, which discloses the incorporation of a vegetable oil in instant pudding mixes as a foam depressant. According to U.S. Pat. No. 2,901,355, such oils do reduce in part the foaming tendency of instant pudding mixes, but they are effective only when certain manufacturing and recipe conditions are adhered to and when non-hydroxy propylated starches are used. The said U.S. Pat. No. 2,901,355 proposes to avoid the short comings of the edible oils as foam depressants by incorporating in the instant pudding mix, in addition, a hydrophilic lipin dissolved in what is termed "a dry-to-the-touch free-flowing readily dispersible granular shortening." The hydrophilic lipins are generally partial fatty acid esters of water soluble hydroxy substances such as glycerol, sugars and hydroxy carboxcylic acids. Such oils and their incorporation with hydrophilic lipins are not operative when the modified starches of this application are used as the starch ingredient.

Another instant pudding mix on the market contains lecithin as the foam depressant. However, U.S. Pat. No. 3,231,391 alleges that lecithin will function as a foam dispersant under certain conditions when used in a proper amount in an instant pudding mix. However, the patent discloses that to obtain satisfactory results certain mixing conditions must be adhered to during compounding of the dry mix and the foam depressing action of the lecithin is reduced considerably on storage of mixes containing it. Lecithin also has the disadvantage that it may impart an off taste to the pudding.

Triacetin and similar low molecular weight aliphatic acid esters have traditionally been employed as plasticizers, softening agents, fixatives and more recently as dispersing agents for hydrophilic colloids which employed at concentrations of from about 1 to about 15 percent by weight of the colloid which is disclosed in U.S. Pat. No. 3,364,036 issued Jan. 16, 1968. These di- and trisubstituted esters of glycerol have extremely low volatility, slight flavor and aroma, excellent water solubility at room temperature, negligible or no solubilization of hydrophilic polymers, and very high densities that aid in sinking particles of the colloidal polymer into the solvent. Triacetin and the aliphatic acid esters disclosed in the above patent function as dispersants by coating the hydrophilic colloid thereby acting as a wetting agent to allow the individual particle of the hydrophilic colloids to dissolve freely in water without any type of inter-reaction between the two components.

When pregelatinized non-propoxylated starches are used for making instant pudding the chief difficulty is surface foam and not internal foaming. It is the surface (pebbly surface) with which the above patents are chiefly concerned. When the newer propoxylated starches are used then the chief difficulty is the internal aeration to produce puddings with a spongy texture.

In contrast to the prior art, it has been found that certain low molecular weight, aliphatic acid esters of polyhydric alcohols interact with hydroxy propylated starch materials to interfer with the film forming properties of the latter. This results in creamier food preparations which are devoid of foam throughout. In other words, tolerance to the mixing step is achieved through the use of the above materials to consistantly give a creamy, non aerated type pudding.

SUMMARY OF THE INVENTION

The essence of the invention resides in the discovery that low molecular weight, aliphatic acid esters of polyhydric alcohols such as diacetin, triacetin, dipropionin, tripropionin and the like when combined modified starches, particularly with propoxylated starches in a pudding dessert composition or food product having a desirably similar texture and mouthfeel, a foodstuff is derived which is free of foam and is creamy in texture. The acid esters of this invention serve to interfer with the film forming properties of these modified starches, a property which is believed to be unique to these acid esters and diversely separate from their dispersent properties due to inability of other well known dispersents such as silicone oil, "Emplex," "Aerosol O.T." and calcium acetate to produce a foodstuff having the aforementioned desirable qualities.

The aliphatic acid esters of polyhydric alcohols which may be employed in the foodstuffs containing the propoxylated starches are those esters which preferably have extremely low volatility, slight flavor and aroma, excellent water solubility at room temperature and high densities. These ordinarily comprise the low molecular weight aliphatic acid esters of polyhydric alcohols. Higher molecular weight esters containing more than three carbons are effective antifoaming agents but are undesirable for use in food systems due to the obvious off flavor they impart when employed at even the lowest level of use in this invention. Of the low molecular weight esters mentioned previously, triacetin is preferred due to the fact that it has the least amount of off-odor and off-taste when used in food systems at the level required to obtain the previous beneficial effect.

The starches of this invention are those starches which preferably have been modified by propoxylation, the degree of propoxylation ranging from about 0.5 to 10 percent, a range of 2 to 7 percent propoxylation being preferred. Starches which have been modified by conventional methods such as oxidation with, for example sodium hypochloride, esterification with phosphates, acid and heat hydrolysis and similar techniques may also be utilized within the confines of this invention but do not produce so creamy a foodstuff as when the specific propoxylated starches of this invention are employed. Consequently, the latter are the most preferred modified starches for use in this invention.

In summary, the subject acid esters of this invention when combined by methods known in the art with specific modified starches either concurrently or sequentially with ingredients of a pudding or pudding like system, produce a foodstuff which is devoid of foam on preparation and results in a creamy textured product when in consumable condition.

The principle object of this invention therefore is to provide foodstuffs which are devoid of foam and which possess a desirable creamy appearance and mouthfeel.

The salient factors of the present invention will become apparent from the description of the preferred embodiment as set forth below.

DESCRIPTION OF THE INVENTION

The composition of the present invention is, in its basic form, an aliphatic acid ester a one, two or three-carbon polyhydric alcohol or combinations thereof with a modified starch together with typical ingredients of an instant pudding or similar type foodstuff results in a product which is creamy in texture and is devoid of foam particularly in the preparation stage. The esters which may be employed in this invention are those which preferably have an extremely low volatility, have negligible flavor and aroma, have excellent water solubility at room temperature and have relatively high density. Examples of such esters are as previously mentioned diacetin (glyceryl diacetate), triacetin (glyceryl triacetate), dipropionin (glyceryl dipropionate), and tripropionin (glyceryl tripropionate). Similarly, the select modified starches of this invention are those starches which are cold water soluble when gelatinized and which have been modified preferably by propoxylation; the degree of propoxylation being from about 0.5 to about 10 percent and preferably in the range of about 2 to 7 percent.

The combination of the modified starch and acid ester of the present invention may be effected in any way known in the art to produce a degree of intimacy such that the acid ester will be allowed to interfer with the film-forming properties of the modified starch. Therefore a simple homogeneous co-mingling, co-mixing, dry blending, or plating of the acid ester on the modified starch as by ribbon-blending will be operative. It is not critical whether the combination of the elements of this invention is effected before introduction into the food product or whether the components of this invention are sequentially or concurrently combined with the ingredients themselves.

The acid esters are employed in relatively small amounts usually 0.3 to about 3 percent based on the weight of the given foodstuff, a concentration of about 0.5 to about 1.5 percent preferred, a concentration of 1 percent most preferred. The amount of ester employed should preferably not exceed 3 percent due to the off-flavor and aroma that may be imparted to the foodstuff as results from larger amounts of the same. Consequently, the ratio of starch to the antifoaming agent is not critical since the amount of anti-foaming agent present is defined by the amount of off-flavor or taste which it may impart to the foodstuff. However, the conventional instant pudding composition ordinarily contains between about 10 to about 20 percent starch by weight of the entire product in addition to effective amounts of flavoring, coloring, gelling agents, sugar and dextrose.

The following example illustrates the present invention without, however, limiting the same thereto.

EXAMPLE I

A 216 g instant pudding base mix is prepared which contains 39 g. of modified Staley starch No. F4-313 (6.2 percent hydroxy propyl groups) in addition to between about 52 to 60 percent sugar, dextrose and effective amounts of coloring, flavoring, gelling and smoothing agents. The base instant pudding mix is mixed to obtain a homogeneous composition and then is divided into equal portions. One ml of triacetin is plated on one of the 108 g. samples by mixing in the "MIXMASTER" bowl at low speed while slowly adding the triacetin during about one minute of mixing time.

Each dry mix is then separately combined with two cups of cold milk. The milk and pudding composition is then mixed in a rotary beater (MIXMASTER) at low speed until well blended which takes approximately 2 minutes. During the mixing process a minimal amount of foam is seen in the sample containing triacetin as compared to the excessively aerated appearance of the pudding control.

The pudding control and the triacetin-containing sample are each poured into separate containers and allowed to stand for a setting time of about 5 minutes. On evaluation of the finished pudding it is found that the control sample has a great deal of air incorporated in the pudding preparation as evidenced both by the pebbly appearance on the surface of the set pudding and the spongy internal structure. The triacetin-containing mixture however has no evidence of air and the set pudding produced has a smooth shiny surface and a creamy non-foamy internal structure.

On tasting each sample the mouthfeel of the triacetin test sample is far creamier than the significantly aerated pudding control.

EXAMPLE II

An instant pudding composition is prepared according to the method of Example I except that 39.0 g. of esterified starch are employed in place of the propoxylated starch. The ester of starch employed is the acetate where the reagent preferably employed in its preparation is acetic anhydride: either in slightly alkaline aqueous solution for low degrees of substitution, or in pyridine for degrees of substitution ranging up to about 3 percent.

In performing the acetylation, an excess of pyridine is preferably employed which then functions as a solvent after the starch is sufficiently acetylated.

39.0 g of the acetate is then mixed with the other instant pudding ingredients together with 1 ml of diacetin which on preparation results in a non-aerated creamy pudding composition.

What is claimed is:

1. An instant non-aerated creamytextured pudding composition comprising in combination a low molecular weight aliphatic acid ester of a polyhydric alcohol and a modified starch, the amount of acid ester present being in the range of about 0.3 to 3 percent by weight of the pudding such that no preparation said pudding has a reduced tendency to foam.

2. The composition as claimed in claim 1 wherein the amount of acid ester present is from about 0.5 to about 1.5 percent.

3. The composition as claimed in claim 2 wherein the amount of acid ester present is about 1 percent.

4. The composition as claimed in claim 1 wherein the low molecular weight acid ester of the polyhydric alcohol is triacetin.

5. The composition as claimed in claim 1 wherein the modified starch has a degree of propoxylation of about 5 to about 10 percent.

6. The composition as claimed in claim 4 wherein the degree of propoxylation is 2 to 7 percent.

* * * * *